US008530038B2

(12) United States Patent
Braun

(10) Patent No.: US 8,530,038 B2

(45) **Date of Patent: *Sep. 10, 2013**

(54) PANEL MADE OF A WOODEN MATERIAL WITH A SURFACE COATING

(75) Inventor: Roger Braun, Willisau LU (CH)

(73) Assignee: Kronotec AG, Lucerne (CH)

( * ) Notice: Subject to any disclaimer, the term of this patent is extended or adjusted under 35 U.S.C. 154(b) by 84 days.

This patent is subject to a terminal disclaimer.

(21) Appl. No.: 12/892,035

(22) Filed: Sep. 28, 2010

(65) Prior Publication Data

US 2011/0014441 A1 Jan. 20, 2011

Related U.S. Application Data

(63) Continuation of application No. 11/810,301, filed on Jun. 5, 2007, now Pat. No. 7,824,757, and a continuation of application No. 11/597,650, filed as application No. PCT/EP2005/005812 on May 30, 2005, now abandoned.

(30) Foreign Application Priority Data

May 28, 2004 (DE) ........................ 10 2004 026 739
Jun. 8, 2004 (DE) ........................ 10 2004 027 757
Jan. 11, 2005 (DE) ........................ 10 2005 001 363
Jan. 14, 2005 (DE) ........................ 10 2005 002 059

(51) Int. Cl.
*B32B 3/00* (2006.01)
*B32B 21/04* (2006.01)

(52) U.S. Cl.
USPC ........................................ 428/172; 428/537.1

(58) Field of Classification Search
USPC .................. 428/172, 141, 151, 537.1, 195.1, 428/216, 535; 427/408, 416, 417
See application file for complete search history.

(56) References Cited

U.S. PATENT DOCUMENTS

| | | | | |
|---|---|---|---|---|
| 3,719,728 | A * | 3/1973 | Miranda | 526/268 |
| 4,910,073 | A | 3/1990 | Tamura et al. | |
| 6,475,623 | B1 | 11/2002 | Magnusson et al. | |
| 6,558,795 | B2 * | 5/2003 | Olson et al. | 428/413 |
| 7,824,757 | B2 * | 11/2010 | Braun | 428/172 |
| 2001/0010839 | A1 | 8/2001 | Martino | |
| 2003/0124339 | A1 * | 7/2003 | Field et al. | 428/323 |
| 2004/0091629 | A1 | 5/2004 | Konig et al. | |
| 2004/0123542 | A1 * | 7/2004 | Grafenauer | 52/506.01 |
| 2004/0191547 | A1 * | 9/2004 | Oldorff | 428/479.3 |

FOREIGN PATENT DOCUMENTS

EP 1304236 A1 4/2003

* cited by examiner

*Primary Examiner* — Catherine A Simone

(74) *Attorney, Agent, or Firm* — Bachman & LaPointe, P.C.

(57) ABSTRACT

A panel made of a wooden material with a surface coating has an undercoat which is applied to the wooden material and at least one lacquer coating and a functional component. There is produced a panel made of a wooden material with a low-cost surface coating which can be applied easily and is optically appealing.

24 Claims, No Drawings

PANEL MADE OF A WOODEN MATERIAL WITH A SURFACE COATING

CROSS REFERENCE TO RELATED APPLICATION

This is application is a continuation of allowed U.S. patent application Ser. No. 11/810,301, now U.S. Pat. No. 7,824,717, filed Jun. 5, 2007, entitled PANEL MADE OF A WOODEN MATERIAL WITH A SURFACE COATING.

BACKGROUND

Wood materials which are processed to panels are generally surface-coated. It is only the surface coating that gives rise to the actual utility of the panels, since it imparts decorative properties, water resistance, abrasion resistance, chemical resistance, if appropriate resistance toward algae, fungi and/or insects. The surface coating is typically effected by a coating of the panel with a synthetic resin-impregnated decorative paper.

Alternatives to coating with decorative paper have been described, for example in AT 351 744, but these coatings have not become established in practice. AT 351 744 describes the varnishing of a chipboard, a first varnish application being referred to as priming. The primer is applied on both surfaces, top side and bottom side of the chipboard. A second varnish application follows. The second varnish layer is applied on one side, only to the top side of the chipboard. The varnish application is from at least 50 to 500 g/m$^2$. The process proposed here dispenses with decorative paper. The aim is the saving of expensive plant parts such as presses. However, the synthetic resin proposed here predominantly for the varnish layers is melamine, one of the most expensive varnish components. The product proposed in AT 351 744 has not become established in industry, for reasons including cost. The application of the varnish has also been found to be problematic, since it was considered to be necessary to apply thick varnish coats on the assumption that an appropriate, maximum layer thickness is required to achieve the desired durability. However, the application and curing of thick varnish layers is technically complicated and hence costly.

The application of visually satisfactory varnish layers has to date entailed the provision of abrasive layers in the varnish structure, which, after the application and curing of a first varnish layer, cover this first varnish layer. The abrasive layers are in each case sanded off again largely or completely in order to obtain a smooth substrate for the next varnish layer. This multilayer method with intermediate sanding is required to obtain visually appealing varnish layers.

The application of UV-curable varnishes provides a remedy here. One example of the use of UV-curable varnishes is shown by U.S. Pat. No. 4,439,480.

DETAILED DESCRIPTION OF THE PREFERRED EMBODIMENT(S)

The use of decorative paper is also costly and entails disadvantages; especially the shrinkage of the decorative paper in the course of curing is considered to be disadvantageous, since the prevention of warpage of the panels associated with the shrinkage is complicated.

Disregarding the surface coating of a wood material panel with which simple utility can be established, there is increasing demand for surface finishes which meet particular demands, such as abrasion resistance, sound and footfall deadening, complicated coloring, particular thermal conductivity or electrical conductivity or discharge capacity and the like. The adaptation of the wood material panels to such demands is of particular significance for the complete coverage of the market.

SUMMARY OF THE INVENTION

There is therefore a need for a panel made from wood material and having a surface coating, especially a surface coating which includes at least one functional layer, the surface coating being applicable in an inexpensive and simple manner. Also proposed is a process for coating wood materials and an apparatus therefor.

This object is achieved by a panel as claimed in claim 1. In a simple embodiment of the invention, the panel made from wood material is coated with a primer and, atop it, with at least one varnish layer. However, it has been found to be sufficient for the achievement of strength and wear properties suitable for use only to apply very little varnish. The application of varnish, the coating thickness, is in total less than 120 μm, preferably less than 80 μm, more preferably less than 60 μm, advantageously less than 45 μm, more advantageously less than 30 μm.

The varnish, which essentially determines the use properties of the panel, is preferably applied in two or more layers. The above-specified layer thickness of up to 120 μm in total is not exceeded. This measure significantly improves the surface coating of the panel. In the case of application of a plurality of thin layers, for example, unlike in the prior art, no undesired structure is depicted in the surface, i.e. no roller structure when the varnish is applied by means of a roller. Moreover, undesired changes in the appearance of the varnish layer are prevented, which can barely be avoided in the case of application of thick varnish layers. In addition, the application of a plurality of thin varnish layers improves the stressability and the durability of the varnish layer overall; the coating becomes harder-wearing. In the context of this invention, a thin varnish layer is understood to mean a varnish layer of up to 20 μm, preferably of up to 15 μm, advantageously of up to 10 μm.

In a particularly preferred embodiment of the invention, the at least two thin varnish layers, in the case of use of UV-curing varnishes, are applied in such a way that, in each case, an already applied layer is partially gelled, and then the next layer is applied. Apart from the rapid application of the thin varnish layers, it is possible to dispense with the application of an abrasive layer and the subsequent abrasion of the individual varnish layers before the application of the next layer in each case, because the individual layers are thin and—if appropriate as a result of partial gelling—can be applied sufficiently smoothly. The quality, especially the smoothness, of the thin varnish layer also satisfies high visual and mechanical quality demands.

The varnish layer applied in a thin layer in accordance with the invention can—depending on the selection of the varnish—be cured completely or reacted completely with ultraviolet light (UV light) or by electron beam curing EBC; the latter can also be employed without use of photoinitiators.

According to the invention, the surface coating has at least one functional component which is integrated in the at least one varnish layer, or which may be applied as the outer layer or under the at least one varnish layer or as a layer arranged between at least two varnish layers. What should be emphasized is that at least one functional component bonds efficiently to the material of the varnish layer. When the at least one functional component is applied as a layer, the at least one functional layer binds efficiently with the varnish layer(s).

UV-curing varnishes are surprisingly extremely tolerant toward functional components. The curing and buildup of a homogeneous surface coating, in spite of different combinations of functional components and layers of varnish and other substances, is readily possible in accordance with the invention. Thus, as one and the same functional components or layers can be integrated in one or more layers into the surface coating, the surface coating may also have two or more different functional components or layers. By way of example, mention is made only of a layer for footfall deadening and a layer for improving the fire resistance, or two color-imparting layers and one layer of varnish to which a functional component is added to adjust the absorption of UV light.

The functional component is in many cases incorporated into the at least one varnish layer, especially when this layer forms the outer layer of the surface coating. For example, the scratch resistance, the abrasion, the gloss, but also properties such as antibacterial action or associated properties, of the panel are determined both by selection of the suitable UV- or radiation-curing varnish and by selection of suitable functional components, for example nanosilver to obtain antibacterial action or the addition of conductive substances to ensure a given discharge capacity, but also addition of corundum to adjust the abrasion.

A main field of use for panels, in addition to the use as a roof or wall covering or worktop, is also use as a floor covering. The suitability as a floor covering depends essentially upon whether the surface of the panel is sufficiently resistant toward the abrasion caused by walking on the floor and attrition by wheelchairs and other objects. In order that the use parameters such as abrasion properties, wheelchair resistance, stain insensitivity and the like of panels become comparable, EN 13329 lays down use classes for laminate, i.e. for wood material panels which are provided with a surface coating of decorative paper.

The use classes differ between the use of the panels for living purposes and for commercial purposes. The suitability as a worktop, for example in laboratories or workshops, requires exceptional wear resistance, which is tested by special tests, especially by EN 310, 319, 323, 324-1, 438 with requirements for abrasion, scratch resistance, susceptibility to cracking, lightfastness, stain insensitivity and behavior toward steam, pan bottoms and lit cigarettes, and also prEN 717 and DIN 52612

In the case of the panels as claimed in claim 1, especially the floor panels, but also in the case of worktops, the decorative paper is specifically dispensed with in connection with the surface coating. This is replaced by the extremely low varnish application. In spite of the low varnish application, the panels as claimed in claim 1, using EN 13329, are attributable to use classes which in any case meet the stress demands of living spaces. The product as claimed in claim 1 is tested and evaluated with the same testing methods that DIN EN 13329 provides for laminate. For example, in the case of panels which have been provided with the inventive thin varnish layer, according to EN 13329, the rating "Use class 31" (commercial sector) is achieved when corundum has been embedded into the thin varnish layer. This is considered to be an exceptional economic advantage, since high resistance against abrasion is achieved with minimal use of varnish. Equally, the inventive surface coating achieves the high demands of the standards which are prescribed, for example, for worktops.

In a particularly advantageous embodiment of the invention, at least one functional layer, which need not, however, be on the surface of the coated panel, consists of an elastomer. Especially ethylene-vinyl acetate (EVA) or other suitable polyolefins or polymer mixtures which comprise EVA or at least one other polyolefin, but also polyurethanes, especially thermoplastic polyurethanes (TPUs), are suitable for this purpose. The elastic properties of these materials improve the room acoustics properties, but also the sound-deadening properties of the panel, to a great extent. Especially the improved footfall deadening by the use of EVA should be emphasized. In the case of floor panels, especially in the case of elastomers which are applied with relatively high layer thickness (e.g. 5 mm and more), a damping effect on the joints of people who walk on these floor panels is also detectable. Panels provided in this way with functional components and layers are suitable in particular for sports halls. The sound-deadening properties are particularly effective, for example, in the case of wall or roof panels which have an enlarged surface area. The elastomer is applied in a layer thickness of from 0.1 mm up to 10 mm. Even a single layer of an elastomer makes a substantial contribution to the deadening of footfall. However, it is also possible to arrange a plurality of layers which are optionally separated by varnish layers or other functional layers. The binding between primer, elastomer and varnish layer is good. It even withstands high stresses, for example those in commercial use.

The application of various UV-curing varnishes can be utilized particularly advantageously to apply different varnishes, especially matt varnishes and gloss varnishes, in layers, these layers each covering sections of the surface of the panel. Matt varnish is applied in sections as a functional layer. In addition, a varnish layer of gloss varnish is applied. Even this simple two-layer surface coating enables optical effects. In a preferred development of the invention, the layer sequence of layers of matt varnish and gloss varnish is arranged so as to form visually perceptible structures. These structures are notable in that viewers perceive three-dimensional patterns. These patterns of three-dimensional appearance consist of a sequence of gloss varnish and matt varnish layers and can be used to create imaginative decorations, but also to simulate natural decorations. What should be thought of here is in particular the simulation of pore structures.

An alternative to the production of visually perceptible structures can likewise, in accordance with the invention, be implemented by the introduction of at least two functional layers. A first functional layer, which covers sections of the surface of the panel and repels a color-imparting coating, and at least one second layer which consists of a color-imparting coating which covers sections of the surface of the panel. For example, a first functional layer comprising waxes or oils can be applied in sections and prevents the attachment of dye or of a color-imparting coating onto the surface of the wood material. In this way, visually perceptible structures are obtained.

The above-described embodiments of panels made from wood material with visually perceptible structures by application of one functional layer or of at least two functional layers preferably have surface coatings in which at least one functional layer is covered by at least one varnish layer.

In a preferred embodiment of the inventive panel, the functional component used is a UV light-absorbing substance. A typical possibility is that of bodies or substances having dimensions in the nano range, i.e. with dimensions up to 950 nm. UV light-absorbing substances or compounds are usually metal compounds, especially metal oxides such as zinc oxide, which are known to reflect or absorb UV light. This substance preferably is or appears to be transparent. It is also preferred when this functional component is used in the final varnish layer, or arranged at or close to the surface of the surface coating. It displays exceptional protective action when it is applied above color-imparting coatings or coatings which can be altered by UV light.

A further advantageous embodiment of the inventive panel envisages that the functional component used is a flame-retardant substance or a substance which increases the fire resistance of the wood material. Flame-retardant substances or substances which improve the fire resistance are known per se. These include, for example, waterglass or other inorganic substances such as vermiculites. Preference is also given here to using transparent substances.

The functional component used is preferably also a substance or a mixture of substances with which the sliding resistance of the surface of the wood material can be adjusted. Typical substances are wax or oils or mixtures thereof, but also mineral substances, especially fine sand. This functional layer is preferably arranged as the outer layer of the surface. It is also advantageous to introduce at least one functional component with which the tactile properties of the surface of the wood material or of the coated panel can be adjusted into the surface coating of a panel. Here too, waxes, oils or mixtures thereof and mineral substances, for example fine sand, which are used as so-called matting agents, are suitable for imparting a velvety feel to the surface of the panel. This functional component may be applied as the external layer of the surface coating. It may also be arranged within the layer structure, since the surface coating overall is generally sufficiently thin that, for example, even layers arranged between the varnish layers are active in adjusting the tactile properties.

Especially in conjunction with color-imparting layers, the functional component used is a topcoat varnish with defined gloss, which influences the gloss of the surface coating or of the surface of the panel.

The invention also encompasses a panel in which the invention provides that the functional layer applied is a substance with which the antistatic properties of the surface of the wood material can be adjusted. The antistatic properties of the surface of the wood material can be adjusted by adding carbon black, although the coloring is greatly restricted. Alternatively, surfactants may be added as the functional component in order to promote water absorption into the varnish. Finally, it is possible to use conductive fabrics, which in turn impairs the appearance of the surface. It is particularly preferred in the context of the invention to use transparent conductive particles as the functional component or layer. It has been found that a single layer of synthetic resin or varnish admixed with small amounts of the particles mentioned is sufficient to ensure a significant improvement in the discharge capacity in a permanent manner independent of further parameters such as ambient moisture, for example to provide a surface for a floor capable of discharge according to DIN IEC 61 340.

Transparent conductive particles are obtained, for example, by applying metal oxides to support particles. For example, a mica particle which has been doped with tin oxide and antimony oxide is suitable. Transparent particles may be of platelet or spherical shape. Good conductivity and transparency and also optimal discharge capacity is achieved with particles which a diameter of up to 25 μm, preferably up to 15 μm, preferentially up to 10 μm.

According to the invention, it is sufficient when the electrically conductive, transparent particle is present in only one layer of a multilayer synthetic resin structure on an overlay or a wood material panel. According to the invention, up to 15% by weight of electrically conductive transparent particles based on the solids content of the synthetic resin are sufficient; preference is given to using up to 10% by weight, particular preference to using up to 8% by weight, of particles based on the solids content of the synthetic resin.

A surface capable of discharge on an overlay or a wood material panel is formed when at least one layer, i.e. up to 40 $g/m^2$ of a synthetic resin admixed with transparent conductive particles in accordance with the invention, is applied. In a preferred embodiment, up to 25 $g/m^2$, more preferably up to 15 $g/m^2$, advantageously up to 10 $g/m^2$, is sufficient. The layer structure of the particular surface may overall quite possibly be over 100 $g/m^2$ in a multilayer structure. In spite of this, only one layer of the synthetic resin admixed with particles in accordance with the invention is sufficient to obtain a surface which has significantly improved discharge capacity.

A measure known per se for increasing the abrasion resistance is the introduction of corundum with the varnish. In the case of panels as claimed in claim 1 too, this measure increases the abrasion resistance, which is a significant parameter for the determination of the use classes to DIN EN 13329. Only the grain size of the corundum has to be selected to be relatively fine, for adjustment to the relatively thin varnish layer. Preference is given to introducing corundum as a functional component into a varnish layer which is not the outermost varnish layer.

The surface coating of the panel may, in an advantageous embodiment of the invention, after the application and curing of the varnish, also be provided with a plastic deformation. In this case, relief-like embossments which are permanent are introduced into the partially gelled or cured surface coating under pressure and if appropriate at elevated temperatures. Surprisingly, it has been found that the surface of a surface-coated material is indeed still plastically deformable without the surface coating being subject to damage. The sealing does not flake off, does not break, and takes on deformations of a depth suitable for the simulation of natural materials. The embossment can thus achieve the perception of the surface of a surface-coated material as a close simulation of natural substances, since touching the surface imparts exactly the structure which is known from natural substances. This perception is promoted in most cases by a coordinated color design. For example, a wood material panel can simulate particular wood types by virtue of a single-layer or multilayer color application. The plastically deformed surface of the sealed panel then complements the pore structure familiar from the preconception of real wood.

In a simple embodiment of the inventive panel, the at least one varnish layer is applied directly to the primer. In industry, such a surface coating is entirely capable of functioning, but very rarely satisfies esthetic demands. Therefore, in a preferred embodiment of the invention, at least one layer, typically at least two layers, of dye are applied as a functional layer between primer and varnish layer. If required, in conjunction with the dye application, it is also possible to apply adhesion promoters or filler coats to the primer, in order to improve the substrate for the dye application.

The dye generally adheres very well on the primer. The adhesion of the varnish on the dye can be improved—if necessary—in a particularly preferred embodiment of the invention by adding at least 5% by weight of varnish to the dye before it is applied. If appropriate, the varnish can be added only to individual dye layers or to all dye layers when more than one dye layer is applied.

is borne.

Especially when dye layers are applied, the combination of two different functional layers in the buildup of the surface coating is obvious. However, it is pointed out explicitly once again that the above-described functional components may either be provided repeatedly in the buildup of the surface coating or that different functional components (two or more) may be combined within one surface coating.

It is considered to be an independent inventive step that a panel made from wood material whose one side intended for use, for example for walking or working on, is provided with a surface coating, and the opposite side, usually referred to as the underside, is coated with varnish at least in sections. This varnish applied at least in sections replaces the papers or veneers which have been customary to date for use as a backing layer. A backing layer is required in order to compensate for the forces occurring in conjunction with the surface coating, especially shrink stresses which occur in the course of drying or curing of the surface coating. It has been found that, surprisingly, in the case of the particularly thin surface coating which is applied to panels as claimed in claim 1 in particular, even a varnish layer applied at least to sections of the underside of the panel is sufficient to compensate for the stress generated by the surface coating, so that the ready-coated panel, after the curing of all coating operations on topside and underside, is not warped.

The varnish can be applied on the underside of the panel in very small amounts. Sufficient amounts are up to 120 g/m$^2$, preferably up to 80 g/m$^2$, more preferably up to 60 g/m$^2$, advantageously up to 45 g/m$^2$, preferably up to 30 g/m$^2$. Specifically in the case of small applications, it may be that a continuous varnish layer is not formed. In this case, a continuous varnish layer is not important; instead, the important factor is the shrinkage that the varnish applied to the underside develops in the course of curing. Known and available varnishes shrink to very different degrees within a wide range in the course of application and curing on wood materials. According to the invention, a varnish whose shrinkage is suitable to compensate for the deformation that the particular surface coating generates is selected. The forces which arise can also be calculated, but it has been found to be simpler to determine the varnish suitable for the underside of the panel by simple tests.

The varnish applied to the underside may be selected as desired. It may be a solvent- or water-based varnish which dries or cures under the action of heat. However, it may also be a varnish which cures by means of UV light or electron beam curing.

It is also considered to be an independent inventive step to propose an apparatus with which the inventive panel can be produced. This apparatus for the coating, especially varnishing, of panels has means of conveying panels to a processing unit and away from a processing unit, and means for applying a coating, especially a varnish coat, and means of partly or completely curing a coating, especially a varnish coat, the means for applying a coating and the means for partly or completely curing a coating being combined to one processing unit by virtue of them being arranged in immediate succession. According to the invention, at least two processing units are provided.

In comparison to the prior art, the processing units are very compact, since apparatus for the sanding of varnish layers can be dispensed with. The immediately successive arrangement sequence of the means for the application of coatings, generally of rollers which apply varnish to the surface of the panel, and of means for partly or completely curing these layers enables the application of the coating to be closely adjusted to its fixing. Regularly, coatings of the surface of a panel also require fixing, usually referred to as curing or reaction. As described in connection with the inventive panel, it may also be partial curing or reaction. A typical use of the means for curing is considered to be the partial gelling of UV-curing varnishes which have been applied immediately beforehand to the surface of a panel. Only after the application of the final varnish layer are the means for curing used in such a way that the coating overall is cured. Means of curing are therefore preferably designed as UV light-emitting apparatus or as apparatus for electron beam curing, but they may also be known apparatus in which the curing is effected by supplying heat.

The partial gelling of the lower varnish layers to which further varnish layers are applied is found to be required to enable the application of further coatings. Without the partial gelling, downstream means of applying further coatings would not be able to deposit the material to be applied correctly onto the layers already applied.

According to the invention, at least two of these processing units are provided; preference is given to the arrangement of at least three processing units, for example for the application of a two-layer undercoat system or of an undercoat and of a functional layer, for example a layer of an elastic polymer material with low Shore hardness, and a layer of a topcoat.

Owing to the compact design of the inventive apparatus and the few means or units required for the coating, it has been found that the achievable operating speeds are exceptionally high. The inventive apparatus can be designed for operating speeds of at least 35 m/min, preferably at least 50 m/min, more preferably at least 70 m/min.

Details of the invention are explained in detail below using the example of working examples:

EXAMPLE 1

A commercial primer is rolled onto a hardboard panel. The application rate is approx. 14 g/m$^2$. This primer levels out unevenness, smoothes fibers and improves the water-repellent properties of the hardboard panel. The primer is essentially an aliphatic polyurethane dispersion (from 80 to 90% by weight) which is applied to the hardboard panel in conjunction with an acrylate copolymer emulsion (between 10 and 15% by weight) and small proportions of water (below 2% by weight) and customary additives for stabilization and defoaming (between 2 and 5% by weight).

A first and a second varnish layer are then applied to the dried primer. In each case 30 g/m$^2$ of a varnish which cures under UV light are initially applied, then the curing is induced under the action of UV light but not completed. The second varnish layer is then applied to the partially cured first varnish layer. This varnish layer too is exposed to UV light but not completely cured. Corundum is added to each of the first two varnish layers. The varnish has the following composition: the content of corundum is from 20 to 25% by weight. An aliphatic polyurethane acrylate makes up from 15 to 25% by weight. From 45 to 55% by weight are made up by a high-functionality aliphatic polyester acrylate. From 2 to 10% by weight is contributed by additives which serve, for example, for defoaming, for stabilization of the varnish, for more rapid curing or for prevention of discoloration of the varnish. Varnishes of this composition are commercially available.

Finally, a UV-curing topcoat is applied at 12 g/m$^2$ to these first two varnish layers. The UV light which is then used finally cures all three applied varnish layers through, which is possible without any further measures owing to the low application rates overall. The topcoat has such a composition that aliphatic high-functionality polyester acrylate makes up from approx. to 50% by weight, aliphatic polyurethane acrylate approx. 15-25% by weight, monomers are added at from 5 to 15% by weight, silicatic constituents make up from approx. 5 to 20% by weight, and additives are added in amounts of from 10 to 25% by weight. These varnishes too are commercially available.

This way of applying the varnish ensures a particularly durable surface coating. The panels obtained in the hardboard panel thus coated are suitable for use as a floor covering. With an abrasion of 2400, they are attributable to abrasion class AC 3 and hence to use class 31 (commercial use) according to EN 13329.

The above-described coating of the panel is effected by means of roller coating. Both the primer and the varnish layers are applied with a roller. The rollers which apply the varnish layers are each part of a processing unit to which, in addition to the rollers, a UV light unit for the partial gelling and curing of the varnish is also assigned. The first two processing units are designed in such a way that the means of application, the UV light units, only partially gel the varnish layer applied. It is only the UV light unit of the third processing unit that brings about complete curing of the applied varnish layers. The inventive apparatus may, depending on the type of coating to be applied, be adjusted to operating speeds of 45 m/min or of 55 m/min.

EXAMPLE 2

A commercial primer is rolled onto a hardboard panel. The application rate is approx. 14 g/m$^2$. This primer levels out unevenness, smoothes fibers and improves the water-repellent properties of the hardboard panel. The primer is essentially an aliphatic polyurethane dispersion (from 80 to 90% by weight) which is applied to the hardboard panel in conjunction with an acrylate copolymer emulsion (between 10 and 15% by weight) and small proportions of water (below 2% by weight) and customary additives for stabilization and defoaming (between 2 and 5% by weight).

A first and a second varnish layer are then applied to the dried primer. In each case 30 g/m$^2$ of a varnish which cures under UV light are initially applied, then the curing is induced under the action of UV light but not completed. The second varnish layer is then applied to the partially cured first varnish layer. This varnish layer too is exposed to UV light but not completely cured. Corundum is added to each of the first two varnish layers. The varnish has the following composition: the content of corundum is from 20 to 25% by weight. An aliphatic polyurethane acrylate makes up from 15 to 25% by weight. From 45 to 55% by weight are made up by a high-functionality aliphatic polyester acrylate. From 2 to 10% by weight is contributed by additives which serve, for example, for defoaming, for stabilization of the varnish, for more rapid curing or for prevention of discoloration of the varnish. Varnishes of this composition are commercially available.

Finally, a UV-curing topcoat is applied at 12 g/m$^2$ to these first two varnish layers. The UV light which is then used finally cures all three applied varnish layers through, which is possible without any further measures owing to the low application rates overall. The topcoat has such a composition that aliphatic high-functionality polyester acrylate makes up from approx. to 50% by weight, aliphatic polyurethane acrylate approx. 15-25% by weight, monomers are added at from 5 to 15% by weight, silicatic constituents make up from approx. 5 to 20% by weight, and additives are added in amounts of from 10 to 25% by weight. These varnishes too are commercially available.

This way of applying the varnish ensures a particularly durable surface coating. The panels obtained in the hardboard panel thus coated are suitable for use as a floor covering. With an abrasion of 2400, they are attributable to abrasion class AC 3 and hence to use class 31 (commercial use) according to EN 13329.

The above-described coating of the panel is effected by means of roller coating. Both the primer and the varnish layers are applied with a roller. The rollers which apply the varnish layers are each part of a processing unit to which, in addition to the rollers, a UV light unit for the partial gelling and curing of the varnish is also assigned. The first two processing units are designed in such a way that the means of application, the UV light units, only partially gel the varnish layer applied. It is only the UV light unit of the third processing unit that brings about complete curing of the applied varnish layers. The inventive apparatus may, depending on the type of coating to be applied, be adjusted to operating speeds of 45 m/min or of 55 m/min.

EXAMPLE 3

A primer (14 g/m$^2$) is applied to a high-density fiber-board (HDF) which is 7 mm thick. Thermoplastic polyurethane (TPU) dyed in a light wood color is applied to the primer in a layer thickness of 0.2 mm. A color print is applied to the TPU, with which simulated wood is obtained on the light wood-colored substrate of the TPU. UV-curing varnish is applied thereon in a layer thickness of 30 μm. Alternatively, three layers of UV-curing varnish are applied in a layer thickness of in each case 15 μm.

The HDF panel provided with three layers of UV varnish fulfills the prerequisites for a commercially usable floor according to EN 13329 for use class 32.

The invention claimed is:

1. A panel made from wood material selected from the group consisting of hardboard and a high density fiberboard and having a surface coating, comprising:

a primer which has been applied to the wood material selected from the group consisting of hardboard and a high density fiberboard and at least one varnish layer, at least one additional varnish layer, the at least one varnish layer and the at least one additional varnish layer having both been cured by means of UV light or by means of electron beam curing (EBC), a total layer thickness of the varnish layers being less than 120 μm, wherein at least one functional component is provided which is applied as an outer functional layer wherein the at least one functional component is a mineral substance which allows a sliding resistance of a surface of wood material and/or tactile properties of the surface of the wood material to be adjusted, and/or wherein at least one functional component is provided which is applied as a functional layer between said varnish layers and wherein the at least one functional component is one of a wax and a mineral substance or a mixture thereof which allows the sliding resistance of a surface of wood material and/or tactile properties of the surface of the wood material to be adjusted.

2. The panel made from wood material as claimed in claim 1, wherein according to provisions of DIN EN 13329, the condition of the use classes for living or for the commercial sector are achieved.

3. The panel made from wood material as claimed in claim 1, wherein the total layer thickness of the varnish layers is less than 80 μm.

4. The panel made from wood material as claimed in claim 1, wherein an additional functional component used is a UV light-absorbing or reflecting substance or UV light-absorbing or reflecting body, having dimensions of less than 950 nm.

5. The panel made from wood material as claimed in claim 1, wherein an additional functional component used is a layer of a UV light-absorbing or reflecting substance or of a UV light-absorbing or reflecting body which is or appears to be transparent.

6. The panel made from wood material as claimed in claim 1, wherein an additional functional component applied is a flame-retardant substance or a substance which increases the fire resistance of the wood material.

7. The panel made from wood material as claimed in claim 1, wherein an additional functional component used is a substance with which the gloss of the surface of the wood material can be adjusted.

8. The panel made from wood material as claimed in claim 1, wherein an additional functional component used is a substance or a mixture of substances with which the antistatic properties of the surface of the wood material can be adjusted.

9. The panel made from wood material as claimed in claim 8, wherein carbon black, surfactants, grids made from conductive substances, conductive, or conductive and transparent, particles are used as the functional component.

10. The panel made from wood material as claimed in claim 1, wherein at least one additional functional component which does not form the surface of the panel comprises means for roughening the surface.

11. The panel made from wood material as claimed in claim 1, wherein at least one color layer has been applied as an additional functional component.

12. The panel made from wood material as claimed in claim 11, wherein the color layer comprises at least 5% by weight of varnish.

13. The panel made from wood material as claimed in claim 1, wherein an uppermost varnish layer has been plastically deformed.

14. The panel made from wood material as claimed in claim 1, wherein a second side opposite a first side of the panel provided with the surface coating is coated at least in sections with varnish.

15. The panel made from wood material as claimed in claim 13, wherein the coating with varnish is up to 120 g/m$^2$.

16. The panel made from wood material as claimed in claim 13, wherein a high-shrink varnish has been applied.

17. The panel made from wood material as claimed in claim 1, wherein the total layer thickness of the varnish layers is less than 60 μm.

18. The panel made from wood material as claimed in claim 1, wherein the total layer thickness of the varnish layers is less than 45 μm.

19. The panel made from wood material as claimed in claim 1, wherein the total layer thickness of the varnish layers is less than 30 μm.

20. The panel made from wood material as claimed in claim 13, wherein the coating with varnish is up to 80 g/m$^2$.

21. The panel made from wood material as claimed in claim 13, wherein the coating with varnish is up to 45 g/m$^2$.

22. The panel made from wood material as claimed in claim 13, wherein the coating with varnish is up to 30 g/m$^2$.

23. The panel made from wood material as claimed in claim 10, wherein the means for roughening the surface comprises corundum.

24. The panel made from wood material as claimed in claim 1, wherein the mineral substance used as said at least one functional component is fine sand.

* * * * *